(12) United States Patent
Zollinger et al.

(10) Patent No.: US 10,050,955 B2
(45) Date of Patent: Aug. 14, 2018

(54) EFFICIENT START-UP FOR SECURED CONNECTIONS AND RELATED SERVICES

(71) Applicant: NETFLIX, INC, Los Gatos, CA (US)

(72) Inventors: James Mitchell Zollinger, Los Gatos, CA (US); Wesley Miaw, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 46 days.

(21) Appl. No.: 14/920,641

(22) Filed: Oct. 22, 2015

(65) Prior Publication Data

US 2016/0119318 A1   Apr. 28, 2016

Related U.S. Application Data

(60) Provisional application No. 62/068,504, filed on Oct. 24, 2014.

(51) Int. Cl.
| | |
|---|---|
| *H04L 9/32* | (2006.01) |
| *H04L 29/06* | (2006.01) |
| *H04L 9/08* | (2006.01) |
| *H04W 12/06* | (2009.01) |
| *H04W 12/08* | (2009.01) |

(52) U.S. Cl.
CPC .......... *H04L 63/083* (2013.01); *H04L 9/0819* (2013.01); *H04L 9/0841* (2013.01); *H04L 9/0861* (2013.01); *H04L 9/3228* (2013.01); *H04L 9/3242* (2013.01); *H04L 9/3247* (2013.01); *H04L 63/061* (2013.01); *H04W 12/06* (2013.01); *H04W 12/08* (2013.01)

(58) Field of Classification Search
CPC ..... H04L 63/083; H04L 9/081; H04L 9/0861; H04L 9/3247; H04L 63/061; H04W 12/06; H04W 12/08
See application file for complete search history.

(56) References Cited

U.S. PATENT DOCUMENTS

| | | | |
|---|---|---|---|
| 6,510,236 B1 | 1/2003 | Crane et al. | |
| 8,977,854 B2 * | 3/2015 | Lee | H04L 51/04 709/206 |
| 9,537,899 B2 | 1/2017 | Cox et al. | |
| 2004/0054898 A1 | 3/2004 | Chao et al. | |

(Continued)

OTHER PUBLICATIONS

International Search Report and Written Opinion for International Application No. PCT/US2015/057213 dated Feb. 1, 2016, 13 pages.

(Continued)

*Primary Examiner* — Techane Gergiso
(74) *Attorney, Agent, or Firm* — Artegis Law Group, LLP (57) ABSTRACT

One embodiment of the present invention includes an approach for efficient start-up for secured connections and related services. A client machine receives, via an application program, a request to send a secure message to a server machine. The client machine transmits a plurality of messages to the server machine that includes a first message comprising at least two of user authentication data, entity authentication data, key exchange data, and encrypted message data. The client machine receives, from the server machine, a second message that includes a first master token comprising a first set of session keys for encrypting and authenticating messages exchanged with the server machine.

20 Claims, 6 Drawing Sheets

(56) References Cited

U.S. PATENT DOCUMENTS

| | | | |
|---|---|---|---|
| 2005/0008158 A1 | 1/2005 | Huh et al. | |
| 2007/0130463 A1* | 6/2007 | Law | G06F 21/34 |
| | | | 713/168 |
| 2007/0208936 A1* | 9/2007 | Ramos Robles | H04L 63/0815 |
| | | | 713/168 |
| 2008/0034216 A1 | 2/2008 | Law | |
| 2008/0212771 A1* | 9/2008 | Hauser | G06F 21/305 |
| | | | 380/44 |
| 2009/0204808 A1 | 8/2009 | Guo et al. | |
| 2009/0217033 A1 | 8/2009 | Costa et al. | |
| 2009/0265554 A1* | 10/2009 | Robles | H04L 63/0815 |
| | | | 713/168 |
| 2010/0257588 A1 | 10/2010 | Urien | |
| 2013/0067552 A1 | 3/2013 | Hawkes et al. | |
| 2013/0086381 A1* | 4/2013 | Thomas | H04L 9/3234 |
| | | | 713/168 |
| 2013/0212704 A1* | 8/2013 | Shablygin | G06F 21/6218 |
| | | | 726/28 |
| 2013/0268767 A1* | 10/2013 | Schrecker | G06F 21/31 |
| | | | 713/185 |
| 2014/0019753 A1* | 1/2014 | Lowry | H04L 63/062 |
| | | | 713/155 |
| 2014/0237250 A1* | 8/2014 | Menezes | H04L 9/3213 |
| | | | 713/172 |
| 2015/0082392 A1* | 3/2015 | Gregg | G06F 21/335 |
| | | | 726/4 |
| 2015/0088758 A1* | 3/2015 | Varadarajan | G06Q 20/3276 |
| | | | 705/71 |
| 2015/0113275 A1* | 4/2015 | Kim | H04L 9/3273 |
| | | | 713/169 |
| 2016/0127902 A1* | 5/2016 | Ciarniello | H04L 63/0838 |
| | | | 380/247 |
| 2017/0017957 A1* | 1/2017 | Radu | G06Q 20/3829 |
| 2017/0085381 A1* | 3/2017 | Richardson | G06F 21/31 |

OTHER PUBLICATIONS

International Search Report and Written Opinion for International Application No. PCT/US2015/057220 dated Feb. 2, 2016, 13 pages.
International Search Report and Written Opinion for International Application No. PCT/US2015/057224 dated Jun. 13, 2016, 13 pages.
Ganesan, R., "Yaksha: augmenting Kerberos with public key cryptography", Network and Distributed System Security, 1995, Proceedings of the Symposium on San Diego, CA, Feb. 16-17, 1995, Los Alamitos, CA, IEEE Comput. Soc, Feb. 16, 1995, pp. 132-143, XP010134533.
Wang et al., "Joint data aggregation and encryption using Slepian-Wolf coding for clustered wireless sensor networks", Wireless Communications and Mobile Computing, Jan. 1, 2009, pp. 573-583, XP55277264.
Molva et al., "KryptoKnight authentication and key distribution system", Nov. 23, 1992, Correct System Design; [Lecture Notes in Computer Science; Lecture Notes Computer], Springer International Publishing, Cham, pp. 155-174, XP047003809.
Non-final Office Action for U.S. Appl. No. 14/920,661 dated Jan. 2, 2018.

* cited by examiner

EFFICIENT START-UP FOR SECURED CONNECTIONS AND RELATED SERVICES

CROSS-REFERENCE TO RELATED APPLICATIONS

This application claims the benefit of the United States provisional patent application titled, "MESSAGE SECURITY LAYER FOR COMMUNICATIONS OVER A NETWORK," filed on Oct. 24, 2014 and having Ser. No. 62/068,504. The subject matter of this related application is hereby incorporated herein by reference.

BACKGROUND OF THE INVENTION

Field of the Invention

Embodiments of the present invention relate generally to computer security and, more particularly, to efficient start-up for secured connections and related services.

Description of the Related Art

Machines within a computer network typically employ various techniques to exchange secure messages when those machines communicate with one another in an effort to prevent third-parties from reading or tampering with the exchanged messages and potentially engaging in illegal or undesirable activities such as identity theft, corporate espionage, or stealing or compromising services. Conventional techniques to secure computer communications usually include mechanisms that ensure that a given received message originated from an appropriate machine within the computer network and that the content associated with a given received message was not tampered with or marginalized after being transmitted by an appropriate machine within the computer network.

Exemplary approaches for exchanging secure messages include Transport Layer Security (TLS) and predecessor Secure Sockets Layer (SSL). TSL and SSL are cryptographic protocols designed to provide communications security over a computer network for various purposes, including web browsing, email, Internet faxing, instant messaging, and voice-over-IP (VoIP). In general, TLS and SSL can be used to secure all communications between server machines offering various online services and client machines that access such online services. The TLS and SSL protocols provide privacy and data integrity during message exchange between two or more communicating computer applications executing on two or more different machines.

One such technique involves encrypting messages prior to transmitting those messages from one machine within the computer network to another. In a typical implementation, an originating machine transmits a security "certificate" to other computing machines within the computer network. The security certificate includes information setting forth the manner in which a message needs to be encrypted in order for the machine transmitting the certificate to be able to decrypt the message.

A typical approach for establishing secure communications between a client and a server begins with the client issuing a request for a secure session to a server. The server responds by transmitting a certificate to the client that contains the server's public key. The client then verifies the authenticity of the certificate by issuing authentication requests to one or more authentication servers associated with certification authorities. One or more of the authentication servers transmits an authentication response to the client indicating whether the certificate is valid or has been revoked or otherwise compromised. If the client determines, from the authentication responses, that the certificate is valid, then the client generates a key, encrypts the key using the certificate, and transmits the encrypted key to the server. The client and server can then securely exchange one or more data messages, also referred to as payload data, where the data messages are encrypted with the key.

One drawback to the above approach is that large numbers of messages are typically sent among the client, server, and authentication servers before any actual data messages may be securely exchanged. As a result, a significant amount of time can pass before a client and server are actually able to securely exchange data messages. For example, up to eleven pairs of messages could be exchanged to establish secure communications before any data messages can be securely exchanged. Another drawback to the above approach is that the time and bandwidth devoted to establishing secure communications between the client and server may be relatively high compared to the time and bandwidth devoted to transmitting actual data between the client and server. As a result, the overall efficiency of the communication channel between the client and server may be negatively impacted.

As the foregoing illustrates, what is needed in the art is more efficient way to initiate secure communications between a client and a server or other set of network connected entities in a computer network.

SUMMARY OF THE INVENTION

One embodiment of the present invention sets forth a computer-implemented method for efficient start-up for secured connections and related services. The method includes receiving, via an application program, a request to send a secure message to a server machine. The method further includes transmitting a plurality of messages to the server machine that includes a first message comprising at least two of user authentication data, entity authentication data, key exchange data, and encrypted message data. The method further includes receiving, from the server machine, a second message that includes a first master token comprising a first set of session keys for encrypting and authenticating messages exchanged with the server machine.

Other embodiments of the present invention include, without limitation, a computer-readable medium including instructions for performing one or more aspects of the disclosed techniques, as well as a client machine, server machine, or other computing device for performing one or more aspects of the disclosed techniques.

At least one advantage of the disclosed approach is that the client machine transmits a request for a secure session, authentication data, and even payload data to the server in a single message. The server responds by transmitting a message that includes a master token, user ID token, key exchange data, and payload data in a single message. As a result, a secure communications session is established and data is exchange via a single pair of messages, leading to improved latency and efficiency relative to prior approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not

DETAILED DESCRIPTION

In the following description, numerous specific details are set forth to provide a more thorough understanding of the present invention. However, it will be apparent to one of skill in the art that the present invention may be practiced without one or more of these specific details.

Techniques are described herein for authenticating and encrypting messages exchanged between client machines and server machines. The techniques are referred to herein as "message security layer" (MSL). In one embodiment, multiple types of authentication (such as user authentication and entity authentication), cryptographic key exchanges, and payload data may be made in one pair of messages exchanged between the client machine and the server machine. For example, a sending machine could include entity authentication data, user authentication data, payload data and a key request in a single message. These techniques are now described in greater detail below.

System Overview

Figure 1:
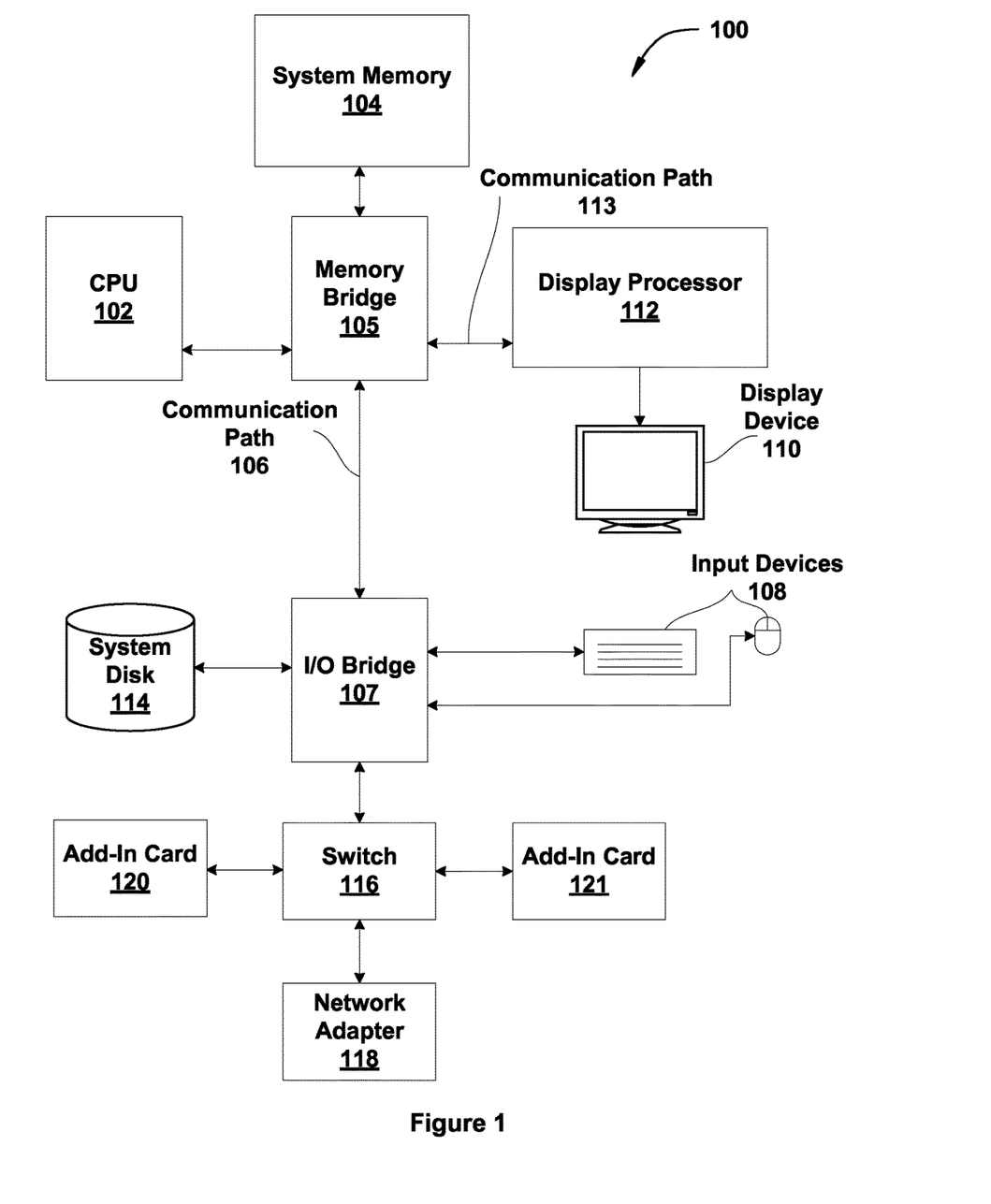
FIG. 1 is a block diagram illustrating a computer system configured to implement one or more aspects of the present invention.

FIG. 1 is a block diagram illustrating a machine 100 configured to implement one or more aspects of the present invention. Machine 100 may be a personal computer, video game console, personal digital assistant, mobile phone, mobile device or any other device suitable for practicing one or more embodiments of the present invention.

As shown, machine 100 includes, without limitation, a central processing unit (CPU) 102 and a system memory 104 communicating via a bus path that may include a memory bridge 105. CPU 102 includes one or more processing cores, and, in operation, CPU 102 is the master processor of machine 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows machine 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to machine 100, via network adapter 118 or system disk 114. The render farm generates one or more rendered images of the scene using the provided instructions and/or data. These rendered images may be stored on computer-readable media in a digital format and optionally returned to machine 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including any rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Client/Server Communications Over the Network

Figure 2:
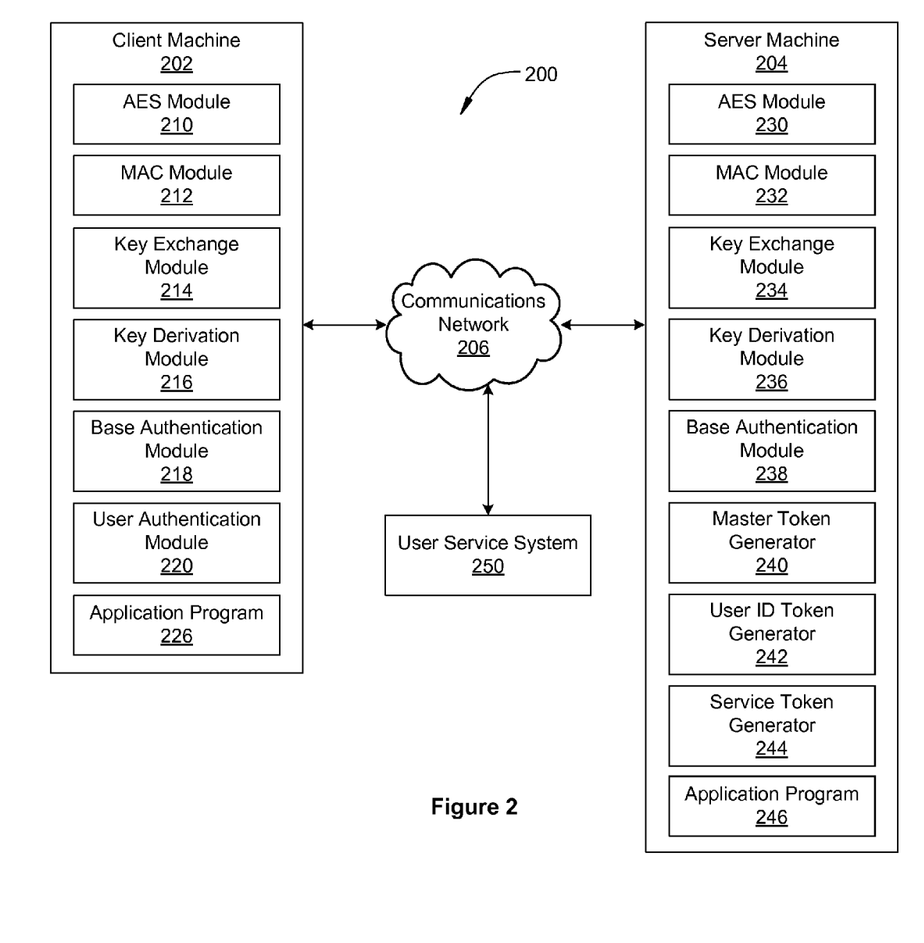
FIG. 2 illustrates a networked computing system configured to implement one or more aspects of the present invention.

FIG. 2 illustrates a computer network 200 configured to implement one or more aspects of the present invention. As shown, the computer network 200 includes, without limitation, a client machine 202, a server machine 204, and a user service system 250 connected to each other via a communications network 206. The communications network 206 may be any suitable environment to enable communications among remotely located machines, including, without limitation, a LAN (Local Area Network) and a WAN (Wide Area Network).

The client machine 202 is configured to exchange data with a server machine 204. In some embodiments, the client machine 202 and the server machine 204 may also communicate with one or more user service system 250s, such as user service system 250. The client machine 202 is configured to transmit messages to the server machine 204. The server machine 204 is likewise configured to transmit messages to the client machine 202. The messages exchanged between the client machine 202 and the server machine 204 include one or more of message data, authentication information, authorization information, tokens, key exchange data, authenticated data and encrypted data. In some embodiments, the client machine 202 and the server machine 204 may communicate with the user service system 250 for the purpose of user authentication, as further described herein.

The client machine 202 includes an AES module 210, a MAC module 212, a key exchange module 214, a key derivation module 216, a base authentication module 218, a user authentication module 220, and an application program 226. The server machine 204 includes an AES module 230, a MAC module 232, a key exchange module 234, a key derivation module 236, a base authentication module 238, a master token generator 240, a user ID token generator 242, a service token generator 244, and an application program 246. The functions of these various modules and token generators are now described in further detail.

The Advanced Encryption Standard (AES) modules 210 and 230 perform symmetric key cryptography on data transmitted between the client machine 202 and the server machine 204. The AES module 210 in the client machine 202 encrypts data for transmission from the client machine 202 to the server machine 204, and decrypts data received by the client machine 202 from the server machine 204. Likewise, the AES module 230 in the server machine 204 encrypts data for transmission from the server machine 204 to the client machine 202, and decrypts data received by the server machine 204 from the client machine 202.

The AES modules 210 and 230 perform two operations. The first operation encrypts plaintext into ciphertext according to equation (1) below:

$$\text{ciphertext} = \text{encrypt}(\text{plaintext, aes\_key, mode, initialization\_vector}) \quad (1)$$

where plaintext is the unencrypted text prior to encryption, aes_key and initialization_vector are parameters employed by the AES units 210 or 230 to encrypt the text according to the Advanced Encryption Standard, and ciphertext is the resulting encrypted text. In some embodiments, an initialization vector is not needed for certain cipher modes of the algorithm. Mode is a configuration parameter for encryption and decryption operations, where mode includes, without limitation, electronic code book (ECB) mode, cipher-block chaining (CBC) mode, and counter mode.

The second operation decrypts plaintext from ciphertext according to equation (2) below:

$$\text{plaintext} = \text{decrypt}(\text{ciphertext, aes\_key, mode, initialization\_vector}) \quad (2)$$

where ciphertext is the encrypted text prior to decryption, aes_key and initialization_vector are parameters employed by the AES modules 210 and 230 to decrypt the text according to the Advanced Encryption Standard, and plaintext is the resulting decrypted text. In some embodiments, an initialization vector is not needed for certain cipher modes of the algorithm. Mode is a configuration parameter for encryption and decryption operations, where mode includes, without limitation, ECB mode, CBC mode, and counter mode.

In various embodiments, the AES modules 210 and 230 may be implemented in software, hardware, or any combination of hardware or software. In particular, the AES modules 210 and 230 may be implemented in a hardware security module (HSM) or inside a trusted execution environment (TEE) for security purposes. In some embodiments, symmetric key crypto algorithms other than AES may be used. In such cases, the AES modules 210 and 230 may be replaced by an module that performs an alternative symmetric key crypto algorithms, including, without limitation, Blowfish, Twofish, and TripleDES. In various embodiments, the AES modules 210 and 230 may be stateless or stateful, depending at least on the mode.

The Message Authentication Code (MAC) modules 212 and 232 perform authentication and integrity protection associated with data transmitted between the client machine 202 and the server machine 204. The MAC module 212 in the client machine 202 generates a MAC corresponding to data for transmission from the client machine 202 to the server machine 204, and verifies a received MAC against the corresponding data received by the client machine 202 from the server machine 204. Likewise, the MAC module 232 in the server machine 204 generates a MAC corresponding to data for transmission from the server machine 204 to the client machine 202, and verifies a received MAC against the corresponding data received by the server machine 204 from the client machine 202.

In various embodiments, the MAC modules 212 and 232 may employ any technically feasible message authentication code technique, including, without limitation, keyed-hash MAC (HMAC), parallelizable MAC (PMAC), or universal hashing MAC (UMAC). By way of example only, the MAC modules 212 and 232 described herein employ HMAC.

The MAC modules 212 and 232 perform two operations. The first operation generates a MAC corresponding to particular data according to equation (3) below:

$$\text{mac}=\text{generate}(\text{data, mac\_key, [hash\_algorithm]}) \tag{3}$$

where data is the input data for which the MAC is generated, mac_key is a parameter employed by the MAC modules 212 and 232 to generate the MAC according to the selected MAC standard, and mac is the generated MAC. Typically, a generated MAC is transmitted along with the corresponding data. hash_algorithm is a parameter needed by some MAC algorithms that specifies a particular hash algorithm. For example, if the MAC module employs HMAC, the value of hash_algorithm could include, without limitation, SHA-1, SHA-256, or SHA-3. If the MAC module employs PMAC or UMAC, the hash_algorithm could be omitted.

The second operation verifies whether a given set of data generates a corresponding MAC according to equation (4) below:

$$\{TIF\}=\text{verify}(\text{data, mac, [hash algorithm]}) \tag{4}$$

where data is the data being authenticated and verified for integrity, mac is the corresponding MAC, and {TIF} is a Boolean value that is true if the MAC modules 212 or 232 successfully verifies the MAC against the data, and false otherwise. As described above, hash_algorithm is a parameter needed by some MAC algorithms that specifies a particular hash algorithm.

In various embodiments, the MAC modules 212 and 232 may be implemented in software, hardware, or any combination of hardware or software. In particular, the MAC modules 212 and 232 may be implemented in an HSM or TEE for security purposes. The MAC modules 212 and 232 may be stateless.

The key exchange modules 214 and 234 are used to exchange keys between client machine 202 and server machine 204. In various embodiments, the key exchange modules 214 and 234 may employ any technically feasible key exchange technique, including, without limitation, Diffie-Hellman or cryptographic key wrapping methods. By way of example only, the key exchange modules 214 and 234 described herein employ Diffie-Hellman key exchange.

In the Diffie-Hellman embodiment, the key exchange module 214 in the client machine 202 generates a public value 'A' to transmit to the server machine 204, and computes a shared secret value from a private value 'a' retained by the client machine 202 and a public value 'B' received from the server machine 204. Likewise, the key exchange module 234 in the server machine 204 generates a public value 'B' to transmit to the client machine 202, and computes the shared secret value from a private value 'b' retained by the server machine 204 and the public value 'A' received from the client machine 202.

The Diffie-Hellman embodiment of the key exchange modules 214 and 234 perform two operations. The first operation calculates the public values A and B from the private values a and b according to equations (5) and (6) below:

$$\text{Client public key: } A=\text{generate}(g, p)=g^a \bmod p \tag{5}$$

$$\text{Server public key: } B=\text{generate}(g, p)=g^b \bmod p \tag{6}$$

where A is the client machine 202 public value, a is the client machine 202 private value, B is the server machine 204 public value, b is the server machine 204 private value, and g (generator value) and p (prime value) are additional parameters for generating the keys.

After calculating the public keys, the key exchange module 214 transmits the public value 'A' for the client machine 202 to the server machine 204. The key exchange module 234 transmits the public value 'B' for the server machine 204 to the client machine 202. In one embodiment, the key exchange module 214 may additionally transmit the 'g' and 'p' values to the server machine 204. In another embodiment, the key exchange modules 214 and 234 may have previously shared, or otherwise agreed upon, the 'g' and 'p' values.

The second operation of the Diffie-Hellman embodiment is calculating the shared secret (ss) value according to equations (7) and (8) below:

$$\text{Client shared secret: ss}=\text{calculate}(B)=g^{ab} \bmod p=B^a \bmod p \tag{7}$$

$$\text{Server shared secret: ss}=\text{calculate}(A)=g^{ab} \bmod p=A^b \bmod p \tag{8}$$

The client machine 202 and the server machine 204 generate the same value for the shared secret. The client machine 202 generates the value of the shared secret based on 'g', 'p', the client machine 202 private value 'a', and the server machine 204 public value 'B'. Likewise, the server machine 204 generates the same value of the shared secret based on 'g', 'p', the server machine 204 private value 'b', and the client machine 202 public value 'A'.

Typically, the key exchange module 214 on the client machine 202 is stateful and the key exchange module 234 on the server machine 204 is stateless. However, in some embodiments, the key exchange module 234 may be stateful. In particular, key exchange module 214 stores 'a' as state at least until the corresponding B value is returned by the server machine 204. The key exchange module 234 calculates the 'b' value, but does not need to maintain 'b' as state. Rather, the key exchange module 234 typically discards 'b' after the server machine 204 calculates the shared secret value and transmits the B key to the client machine 202.

The key derivation modules 216 and 236 compute the session keys from the shared secret value computed by the key exchange modules 214 and 234. Each set of session keys includes two keys, namely, the HMAC key and the AES key, discussed above. The session keys are employed by various entities engaging in secure communications for the purpose of encrypting and authenticating messages. Each message created by an entity using the MSL protocol may include both authentication/integrity protection, provided by the generated HMAC using the HMAC key, and data encryption, provided by the AES key. The HMAC key provides authentication and integrity protection for exchanged messages, while the AES key provides privacy by encrypting the data in the message. The key derivation modules 216 and 236 compute the session keys according to equation (9) below:

$$\{k\_sess\_hmac | k\_sess\_aes\} = key\_derive(key\_data) \quad (9)$$

where, in the Diffie-Hellman embodiment, key_data is the shared secret computed by the key exchange modules 214 and 234 and {k_sess_hmac|k_sess_aes} is the session key, which is a concatenation of the HMAC session key and the AES session key. The key_derive function may be any technically feasibly key derivation or generation technique. In one non-limiting example, the key_derive function could be based on SHA-384, which generates 384 bits of key data. In this example, the AES session key could be the leftmost 128 bits of the SHA-384 generated key data, while the HMAC session key could be a 256 bit key that includes the rightmost 256 bits of the SHA-384 key data.

In various embodiments, the session keys may include other keys instead of or in addition to an HMAC key and an AES key.

The key exchange modules 214 and 234 may exchange, in the Diffie-Hellman embodiment, public values and may compute a "shared secret" value that is private to the corresponding client machine 202 and server machine 204.

The base authentication modules 218 and 238 provide authentication of the server machine 204 to the client machine 202 in two circumstances. The first circumstance is during the initial exchange of messages between the client machine 202 and the server machine 204 prior to the establishment of session keys and exchange of master tokens. The second circumstance is when the server machine 204 receives a bad message from the client machine 202, as indicated by, for example, failing to decrypt data received from the client machine 202 or failing to verify an authentication code received from the client machine 202. In other words, base authentication modules 218 and 238 provide authentication on initial message exchange and as failure recovery authentication when a message failure is detected.

In various embodiments, the base authentication modules 218 and 238 may employ any technically feasible authentication technique or algorithm, including, without limitation, Rivest-Shamir-Adleman (RSA) public/private keys, elliptic-curve cryptography, digital signature algorithm (DSA), or Diffie-Hellman. By way of example only, the base authentication modules 218 and 238 described herein employ RSA public/private keys.

When the server machine 204 detects a failure or when exchanging initial messages with the client machine 202, the base authentication module 238 on the server machine 204 generates a signature to transmit to the client machine 202 according to equation (10) below:

$$sig = sign(data, RSA\_privatekey, hash\_algorithm) \quad (10)$$

where data is the data for transmission to the client machine 202, RSA_privatekey is the private RSA key held by the server machine 204, hash_algorithm identifies a particular hash technique, as described herein, and sig is the signature for transmission to the client machine 202 along with the data.

When the client machine 202 receives the message from the server machine 204, the base authentication module 218 on the client machine 202 verifies the message according equation (11) below:

$$\{T | F\} = verify(sig, data, RSA\_publickey, hash\_algorithm) \quad (11)$$

where sig is the received signature generated by the server, data is the corresponding received data, RSA_publickey is the public RSA key which has been pre-provisioned or previously received from the server machine 204, hash_algorithm identifies a particular hash technique, and {T|F} is a Boolean value that is true if the base authentication modules 218 successfully verifies the signature against the data, and false otherwise.

The user authentication module 220 optionally provides user authentication from the client machine 202. When a user of the client machine 202 enters, for example, a username and password, the user authentication module 220 or the user service system 250 determines whether the user has entered valid login credentials. The user authentication module 220 may make this determination by querying locally stored password data or may query a user service system 250. The user authentication module 220 may transmit the username and password to the server machine 204. Optionally, the user authentication module 220 may encrypt or hash the password prior to querying local password data or transmitting the username and password to the user service system 250 or the server machine 204.

The master token generator 240 on the server machine 204 generates master tokens to enable the client machine 202 and the server machine 204 to exchange messages securely. The master token generator 240 generates a pre-master token according to equation (12) below:

$$pre\_MT = issue(ID, k\_sess, renew\_time, exp\_time, seq\_num, MT\_ser\_num) \quad (12)$$

where the ID is a unique identifier, k_sess is the set of session keys generated by the key derivation module 236 (previously described as the HMAC key and AES key), renew_time indicates a time at which the server may choose to renew the master token when a message from the client is received with the renewable flag set, exp_time is the time when the current master token expires, seq_num is an anti-theft sequence number that is incremented when the master token is renewed, MT_ser_num is the master token serial number for token binding purposes, and pre_MT is the generated pre-master token. The ID is one or both of a client ID and an issuer ID, where the client ID identifies the client machine 202 and the issuer ID identifies the server machine 204 that issued the master token. In one embodiment, the ID is the concatenation of the client ID and the issuer ID.

The master token generator 240 then generates the final master token according to equation n(13) below:

$$MT = encrypt(pre\_MT, MT\_key) \quad (13)$$

where pre_MT is the pre-master token, MT_key is a master token encryption key, such as an AES key known only to the server machine 204 and other servers that share the MT_key in order to create a network of trust, and MT is the encrypted master token.

The user ID token generator 242 verifies user authentication and issues user ID tokens. The user ID token generator 242 may verify user authentication by querying a user service system 250 using equation (14) below:

$$\{T | F\} = user\_auth(user\_auth\_data) \quad (14)$$

where user_auth_data is any technically feasible user authentication data supported by the user service system 250, such as username and password, and {T|F} is a Boolean value returned by the user service system 250 that is true if the user authentication data is valid, and false otherwise.

If the user is authenticated, then the user ID token generator 242 generates a pre-user ID token according to equation (15) below:

$$pre\_UIDT = \text{issue}(MT\_ser\_num, UIDT\_renew\_time, UIDT\_exp\_time, UIDT\_ser\_num, user\_data) \quad (15)$$

where MT_ser_num is the master token serial number, UIDT_renew_time indicates a time when a user ID renewable message is to be transmitted by the server machine 204, exp_time is the time when the current user ID token session expires, UIDT_ser_num is the user ID token serial number for binding purposes, user_data is user data to be encrypted, and pre_UIDT is the generated pre-user ID token. Because user authentication typically involves querying an external user server system 250, the UIDT_renew_time and UIDT_exp_time are typically longer than the corresponding master token renew_time and exp_time. The MT_ser_num is used in the generation of the user ID token to ensure that the user ID token is bound to the master token.

The user ID token generator 242 then generates the final user ID token according to equation (16) below:

$$UIDT = \text{encrypt}(pre\_UIDT, UIDT\_key) \quad (16)$$

where pre_UIDT is the pre-user ID token, UIDT_key is a user token encryption key, such as an AES key known only to the server machine 204 and other servers that share the UIDT_key in order to create a network of trust, and UIDT is the encrypted user ID token.

The service token generator 244 generates and encrypts service tokens used by various services to persist state information in client stored tokens such that the server does not need to persist such state. In various embodiments, service tokens may be bound to both master tokens and user ID tokens, to master tokens only, or to no other tokens. The service token generator 244 generates pre-service tokens according to equation (17) below:

$$pre\_ST = (name, data, [MT\_ser\_num], [UIDT\_ser\_num]) \quad (17)$$

where name is the name of the service token and data is any arbitrary data from the corresponding service. In other words, name and data form a key-value pair, essentially operating as an HTTP cookie. Optional parameters include MT_ser_num (if the service token is bound to a master token), and UIDT_ser_num (if the service token is bound to a user UD token). pre_ST is the pre-service token.

The service token generator 244 then generates the final service token according to equation (18) below:

$$ST = \text{encrypt}(pre\_ST, ST\_key) \quad (18)$$

where pre_ST is the pre-service token, ST_key is a service token encryption key, such as an AES key, and ST is the encrypted service token. In some embodiments, the service token may not be encrypted, in which case, the service token is given by equation (19) below:

$$ST = pre\_ST \quad (19)$$

The application program 226 residing on the client machine 202 and the application program 246 residing on the server machine 204 communicate securely with each other via the various modules and generators described herein in conjunction with FIG. 2. In one example, and without limitation, application programs 226 and 246 could be configured to securely stream media content between the client machine 202 and the server machine 204.

In at least one embodiment, application program 226 residing on the client machine 202 may transmit a request to establish a secure communication channel with application program 246 residing on the server machine 204. The application program 226 may transmit such a request to one or more of the modules and generators residing on the client machine 202 as described herein. In response to this request, the modules and generators residing on the client machine 202 may exchange one or more messages with the modules and generators residing on the server machine 204, thereby establishing a secure communication channel between the application program 226 residing on the client machine 202 and the application program 246 residing on the server machine 204.

Although the modules and token generators are described in a particular order, the operations performed by these modules and token generators may be performed in any technically feasible order. For example, the functions performed by the user authentication module 220 could be performed either before or after the operations performed by the base authentication modules 218 and 238. In particular, if a initialization scheme which does not support encryption is used with a user authentication scheme that requires encryption, then a key exchange may need to happen prior to initiation of user authentication in order to ensure secure data transfer. Such an approach may result in additional round-trip message exchange.

In another example, the master token generator 240, user ID token generator 242, and service token generator 244 may be implemented as separate token generators, as a single token generator that generates all three token types, or in any technically feasible combination.

Efficient Start-Up for Secured Connection and Related Services

In order to establish a secure communication channel, a client machine 202 transmits a message including authentication data and a key request to a server machine 204. In one embodiment, this message may include payload data. The server machine 204 responds by sending a user ID token along with key response data that includes a master token. In one embodiment, this message may likewise include payload data. As a result, a secure communication channel is established and payload data may be exchanged via the exchange of one pair of messages between a client machine 202 and a server machine 204. This technique is now described.

Figure 3:
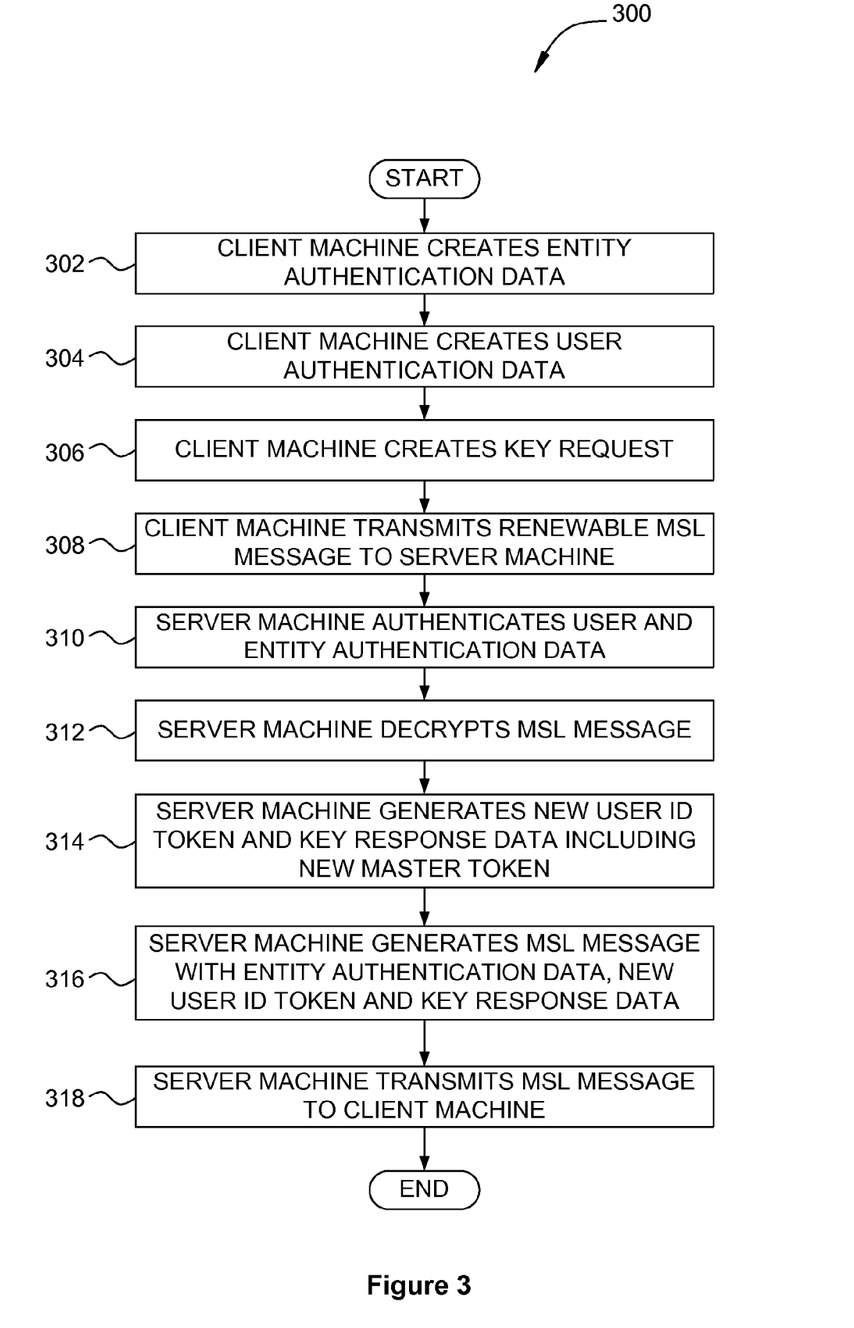
FIG. 3 sets forth a flow diagram of method steps for establishing secure communications between a client machine and a server machine, according to one embodiment of the present invention.

FIG. 3 sets forth a flow diagram of method steps for establishing secure communications between a client machine and a server machine, according to one embodiment of the present invention. Although the method steps are described in conjunction with the systems of FIGS. 1-2, persons of ordinary skill in the art will understand that any system configured to perform the method steps, in any order, is within the scope of the present invention.

As shown, a method 300 begins at step 302, where the client machine 202 creates entity authentication data. The entity authentication data includes data used to identify and authenticate the entity associated with a message. The entity authentication data may be unencrypted, or the entity authentication data may be encrypted via any technically feasible approach, such as via pre-shared keys. At step 304, the client machine 202 creates user authentication data. The user authentication data may be of any technically feasible format, including, without limitation, username with password, username with hashed password, or information associated with an http cookie. At step 306, the client machine 202 creates a key request directed to the server machine 204 for which a secure communication channel is desired. At step 308, the client machine 202 transmits a renewable MSL message to the server machine 204 that includes the entity authentication data, the user authentication data and the key request. In some embodiments, the MSL message may include payload data.

At step 310, the server machine 204 authenticates the entity authentication data and the user authentication data. At step 312, the server machine 204 decrypts the MSL message to recover the key request and optional payload data. At step 314, the server machine 204 generates a new user ID token. The server machine also generates key response data that includes a new master token. In some embodiments, the key response data also includes session keys. At step 316, the server machine 204 generates an MSL message that includes entity authentication data and the key response data, including the new master token. In some embodiments, the MSL message may include either or both of session keys and payload data. At step 318, the server machine 204 transmits the MSL message to the client machine 202. The method 300 then terminates.

Once secure communications are established between the client machine 202 and the server machine 204, the master token may become "renewable" or may expire with the passage of time or after exchange of a specified quantity of messages. The secure communication channel credentials may then be renewed by requesting a new master token and user ID token. In one embodiment, credential renewability may be based on an explicit "renewable" flag in order to improve threading and synchronization performance relative to prior approaches. When a time corresponding to a renewable window is reached, a sending device may include the current master token and key request data in a message that is identified as renewable. In response, a server machine 204 may determine whether and when to renew credentials. Typically, a server machine 204 may renew credentials at the time a message identified as renewable is received. In some cases, such as when there is a significant computational load on the server machine 204, the server machine 204 may defer credential renewal until a later time. In a trusted services network the response includes key response data containing a new master token. Authentication of the response, or of any given message, is performed via the combination of the current master token, which contains the session keys, and the usage of the session key itself. In a peer-to-peer network, the response includes key response data that includes a new master token. This technique is now described.

Figure 4A:
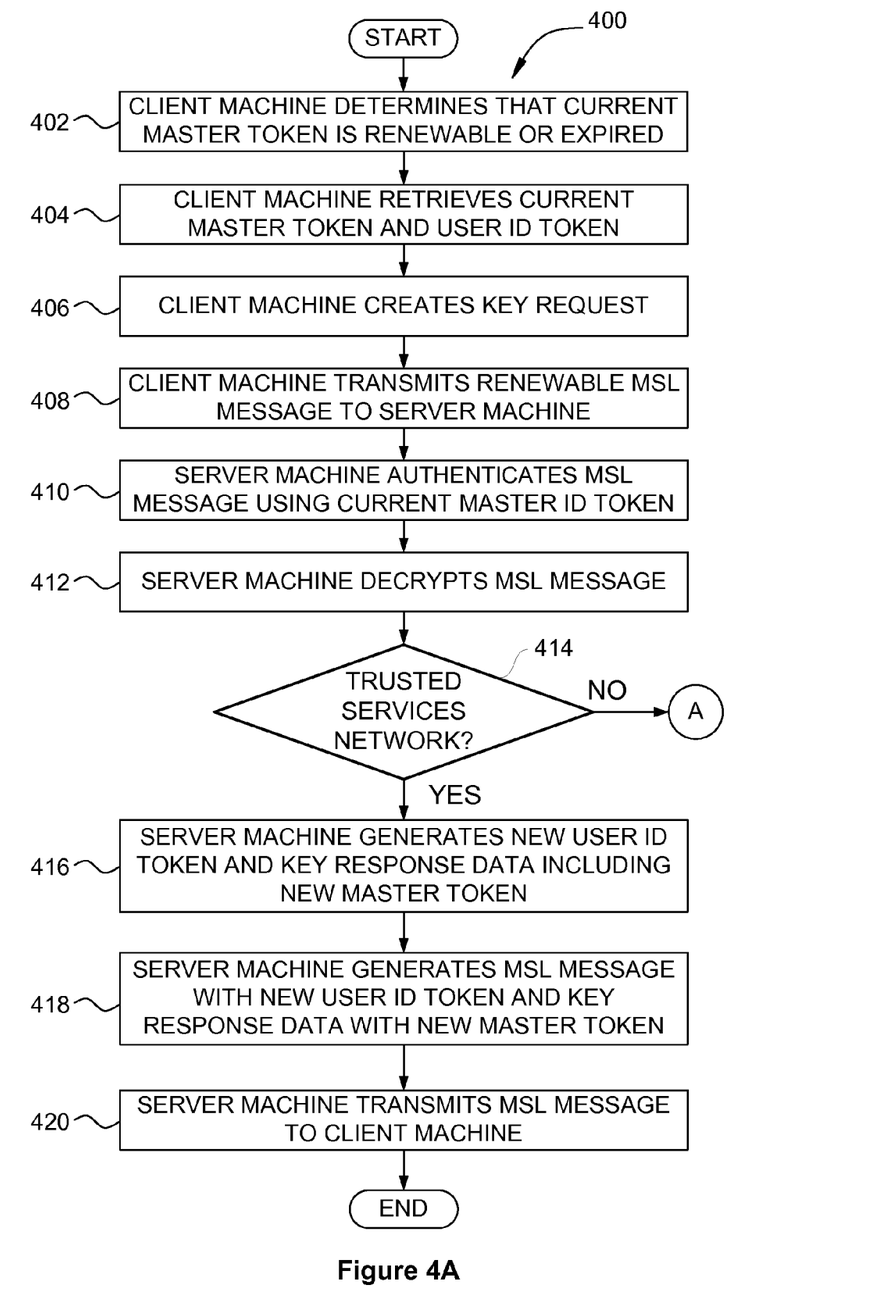
FIGS. 4A-4B set forth a flow diagram of method steps for renewing secure communications between a client machine and a server machine, according to one embodiment of the present invention.
Figure 4B:
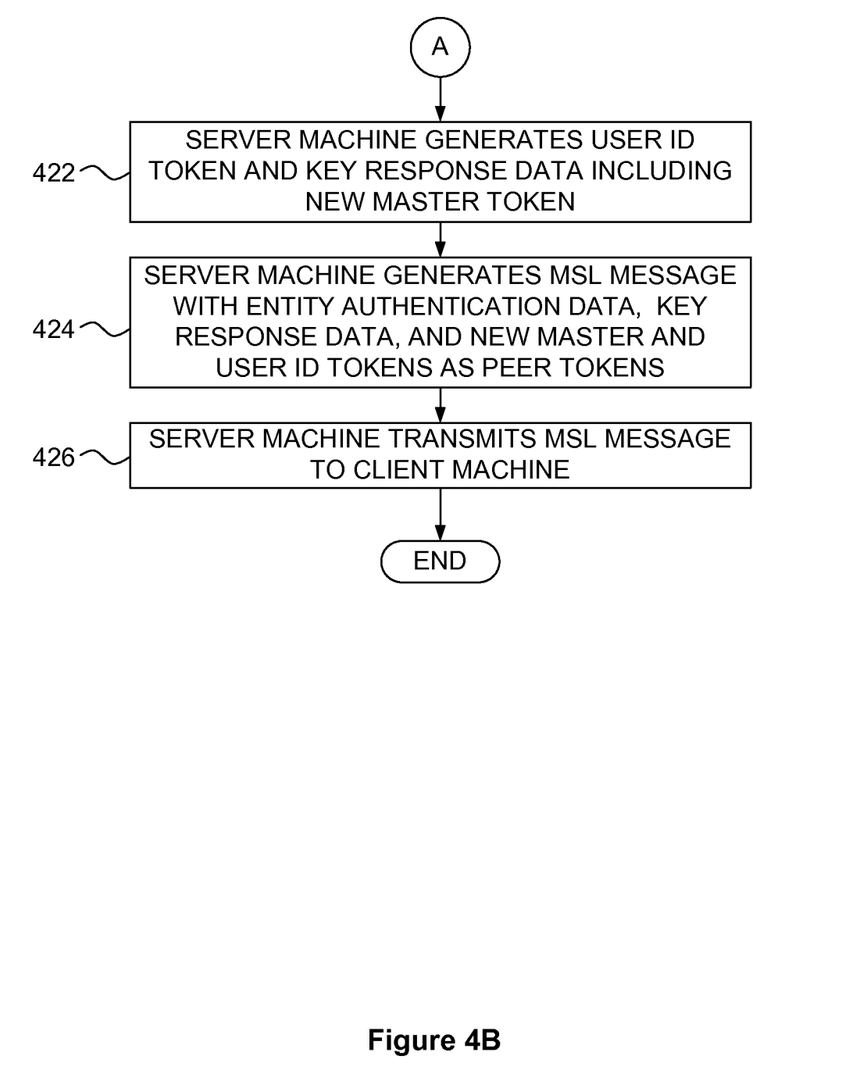

FIGS. 4A-4B set forth a flow diagram of method steps for renewing secure communications between a client machine and a server machine, according to one embodiment of the present invention. Although the method steps are described in conjunction with the systems of FIGS. 1-2, persons of ordinary skill in the art will understand that any system configured to perform the method steps, in any order, is within the scope of the present invention.

As shown, a method 400 begins at step 402, where the client machine 202 determines that the current master token is renewable or expired. The current master token may be renewable or expired based on the passage of time or after exchange of a specified quantity of messages. At step 404, the client machine 202 retrieves the current master token and the current user ID token. At step 406, the client machine 202 creates a key request directed to the server machine 104 to which a secure communication channel has been established. At step 408, the client machine 202 transmits a renewable MSL message to the server machine 204 that includes the current master token, the current user ID token, and the key request. In some embodiments, the MSL message may include payload data.

At step 410, the server machine 204 authenticates the entity authentication data and the user authentication data. At step 412, the server machine 204 decrypts the MSL message to recover the key request and optional payload data. At step 414, the server machine 204 determines whether the server machine 204 is communicating with the client machine 202 over a trusted services network. If the server machine 204 is communicating with the client machine 202 over a trusted services network, then the method proceeds to step 416, where the server machine 204 generates a new user ID token and key response data that includes a new master token. At step 418, the server machine 204 generates an MSL message that includes the new user ID token and the key response data, including the new master token. In some embodiments, the MSL message may include either or both of session keys and payload data. At step 420, the server machine 204 transmits the MSL message to the client machine 202. The method 400 then terminates.

Returning to step 414, if the server machine 204 is not communicating with the client machine 202 over a trusted services network, then the server machine 204 is communicating with the client machine 202 over a peer-to-peer network. In such a case, the method proceeds to step 422, where the server machine 204 generates a new user ID token and key response data that includes a new master token. At step 424, the server machine 204 generates an MSL message that includes the entity authentication data and the key response data, including the new master token. In some embodiments, the MSL message may include either or both of session keys and payload data. At step 426, the server machine 204 transmits the MSL message to the client machine 202. The method 400 then terminates.

It will be appreciated that the techniques described herein are illustrative and that variations and modifications are possible. For example, although the techniques are described with respect to transmitting MSL messages with certain specified components, any technically feasible combination of authentication data, key data, tokens, and other information may be transmitted in a single MSL message. A particular embodiment for exchange secure messages between a client machine 202 and a server machine 204 is now described.

Figure 5:
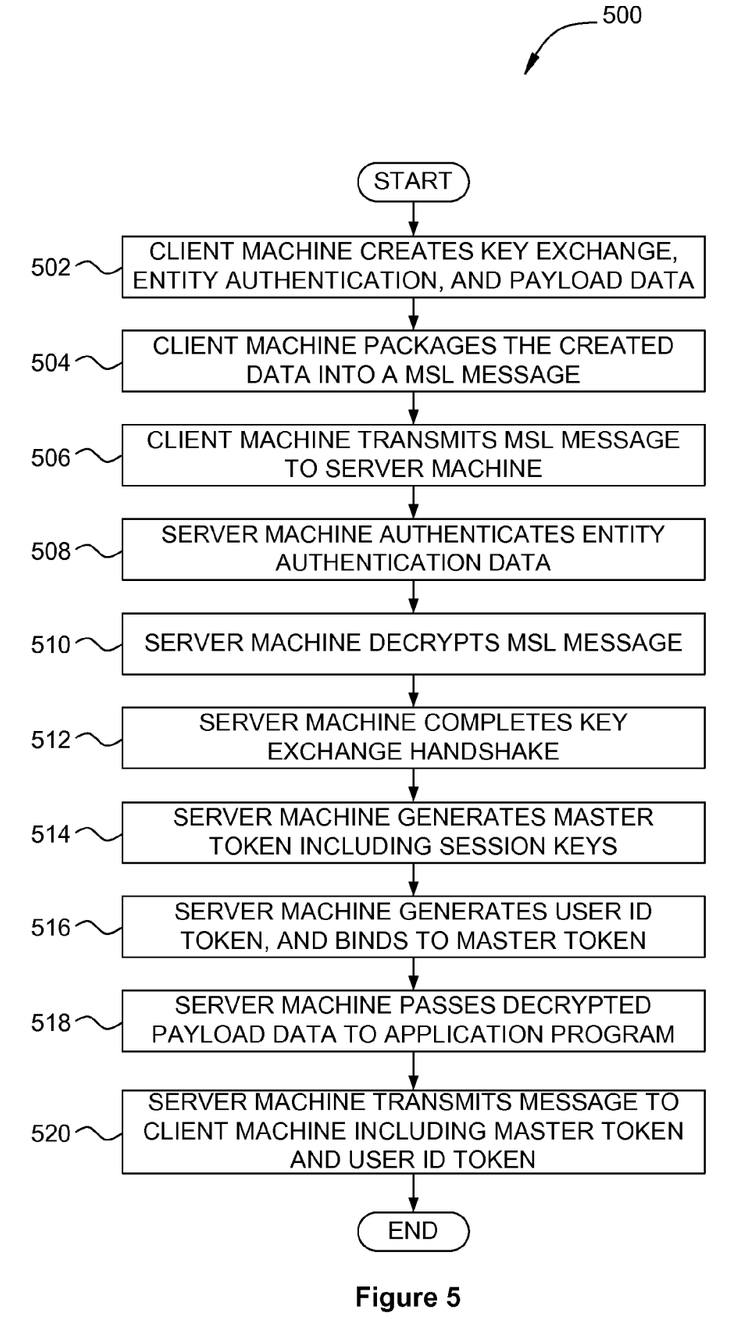
FIG. 5 sets forth a series of method steps for exchanging secure messages between a client machine and a server machine, according to one or more embodiments of the present invention.

FIG. 5 sets forth a flow diagram of method steps for exchanging secure messages between a client machine and a server machine, according to one embodiment of the present invention. Although the method steps are described in conjunction with the systems of FIGS. 1-2, persons of ordinary skill in the art will understand that any system configured to perform the method steps, in any order, is within the scope of the present invention.

As shown, a method 500 begins at step 502, where a client machine 202 creates key exchange data, entity authentication data, and payload data. In some embodiments, the client machine 202 also creates user authentication data. At step 504, the client machine 202 packages the key exchange data, entity authentication data, payload data, and, if applicable, user authentication data, into a MSL message based on keys that are pre-shared, or pre-provisioned, between the client machine 202 and a server machine 204. Packaging the data into the MSL message involves: (a) encryption of the MSL message using a pre-provisioned client encryption key; and (b) authentication of the encrypted MSL message using a pre-provisioned authentication key. The authentication may be accomplished via any technically feasible approach, including, without limitation, HMAC, RSA signature, and ECC signature. At step 506, the client machine 202 transmits the encrypted and authenticated MSL message to the server machine 204.

At step 508, the server machine 204 authenticates the entity authentication data. In some embodiments, the server machine 204 also authenticates the user authentication data. At step 510, the server machine 204 decrypts the MSL message using the pre-shared encryption key. At step 512, the server machine 204 completes the key exchange handshake, producing key exchange data to return to the client, and generates the session keys. At step 514, the server machine 204 generates the master token, where the master token includes the session keys. In various embodiments, the master token may also include, without limitation, an identifier (ID) associate with one or both of a client machine 202 ID and a master token issuer ID, a master token renewal time, a master token expiration time, a sequence number, and a master token serial number. At step 516, the server machine 204 generates a user ID Token and binds the user ID token to the master token using the master token serial number. In various embodiments, the user ID token may include a master token serial number, a user ID expiration time, a user ID renewal time, a user ID serial number, and user data. At step 518, the server machine 204 passes the decrypted payload data to an application program for processing. At step 520, the server machine 204 transmits a message to the client machine that includes key exchange data that, in turn, includes the master token. The message further includes the user ID token. The method 500 then terminates.

In some embodiments, the server machine 204 and the client machine 202 may not have exchanged pre-shared keys. In such embodiments, the client machine 202 may create key exchange data, but may not create user authentication data or payload data at this initial step. The client machine 202 may package the key exchange data into a MSL message for the sole purpose of key exchange. The client machine 202 may send the MSL message to the server machine 204.

The server machine 204 may complete the key exchange handshake by producing key exchange data to return to the client and may generate the session keys. The server machine 204 may generate the master token, where the master token includes the session keys. The server machine 204 may return the master token to the client machine 202.

The client machine 202 may then create user authentication data and payload data. The client machine 202 may package the payload data along with the master token and may create a MSL message. The creation of the MSL message may involve: (a) encryption of the MSL message using an encryption key created during key exchange; and (b) authentication of the encrypted MSL message using a MAC key created during key exchange. The client machine 202 may transmit the encrypted and authenticated MSL message to the server machine 204.

The server machine 204 may decrypt the master token to retrieve the session keys needed to authenticate and decrypt the MSL message from the client. The server machine 204 may authenticate the MSL message using the MAC key retrieved and decrypted by the server machine 204. The server machine 204 may decrypt the MSL message using the encryption key retrieved and decrypted by the server machine 204. The server machine 204 may generate a user ID token and bind the user ID token to the master token using the master token serial number. The server machine 204 may pass the decrypted payload data to the application program for processing.

In sum, a secure communications channel is established between a client machine and a server machine. The client machine transmits authentication data, a request for a key session, and, optionally, payload data to the server in a single message. The server responds by transmitting a master token, user ID token, session keys, and, optionally, payload data in a single message. To renew the secure communications channel, the client machine transmits the current master token and user ID token, a request for a new master token, and, optionally, payload data to the server in a single message. The server responds by transmitting a new master token, other authentication data, and, optionally, payload data in a single message.

At least one advantage of the disclosed approach is that a secure communications session is established and data is exchanged via a single pair of messages, leading to improved latency and efficiency relative to conventional approaches. Another advantage of the disclosed approach is that credentials are renewed and a new master token and session keys are issued automatically with no need for manual intervention. As a result, secure communications are more reliable and more efficient relative to conventional approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the subject matter described herein are set out in the following numbered clauses.

1. A program product comprising a non-transitory computer-readable storage medium including instructions that, when executed by a processor, cause the processor to perform the steps of generating entity authentication data that identifies and authenticates a client machine; generating user authentication data that identifies a user associated with the client machine; generating a first key request for a first plurality of session keys for encrypting and authenticating messages exchanged with the client machine; and transmitting a first message to a server machine that includes the entity authentication data, the user authentication data, and the first key request.

2. The program product of clause 1, further comprising receiving, from the server machine, a second message that includes a first master token comprising the first plurality of session keys.

3. The program product of either clause 1 or 2, wherein the second message further includes the entity authentication data.

4. The program product of any of clauses 1-3, wherein the second message further includes a first user identification token.

5. The program product of any of clauses 1-4, further comprising determining that the first master token is renewable; generating a second key request for a second plurality of session keys; and transmitting a third message to the server machine that includes the first master token, the first user identification token, and the second key request.

6. The program product of any of clauses 1-5, further comprising identifying the third message as renewable.

7. The program product of any of clauses 1-6, further comprising receiving, from the server machine, a fourth message that includes a second master token comprising the second plurality of session keys.

8. The program product of any of clauses 1-7, wherein determining that the first master token is renewable comprises determining that a threshold number of messages has been exchanged between the client machine and the server machine subsequent to receiving the first master token.

9. The program product of any of clauses 1-8, wherein determining that the first master token is renewable comprises determining that a threshold amount of time has passed subsequent to receiving the first master token.

10. The program product of any of clauses 1-9, wherein the client machine and the server machine communicate via a trusted services network.

11. The program product of any of clauses 1-10, wherein the client machine and the server machine communicate via a peer-to-peer network.

12. The program product of any of clauses 1-11, wherein the first message further includes payload data.

13. A server machine, comprising a processor; and a memory coupled to the processor and including a base authentication module, a key derivation module, and a key exchange module; wherein, when executed by the processor, the base authentication module is configured to receive a first message from a client machine that includes entity authentication data, user authentication data, and a first key request, and generate a signature the includes a private key for transmission to the client machine; wherein, when executed by the processor, the key derivation module is configured to generate a first set of session keys in response to the first key request; and wherein, when executed by the processor, the key exchange module is configured to transmit a second message to the client machine that includes the private key and the first set of session keys.

14. The server machine of clause 13, wherein the memory further includes a master token generator, wherein, when executed by the processor, the master token generator is configured to generate a first master token, and the second message further includes the first master token.

15. The server machine of either clause 13 or clause 14, wherein the memory further includes a user identification token generator, wherein, when executed by the processor, the user identification token generator is configured to generate a first user identification token, and the second message further includes the first user identification token.

16. A computer-implemented method, comprising receiving, via an application program, a request to send a secure message to a server machine; transmitting a plurality of messages to the server machine that includes a first message comprising at least two of user authentication data, entity authentication data, key exchange data, and encrypted message data; and receiving, from the server machine, a second message that includes a first master token comprising a first set of session keys for encrypting and authenticating messages exchanged with the server machine.

17. The method of clause 16, further comprising determining that a current time falls within a renewal window that defines a time after which the first master token is renewed if a message that is included in the plurality of messages is identified as renewable.

18. The method of either clause 16 or clause 17, further comprising identifying a second message included in the plurality of messages as renewable; and transmitting the second message to the server machine.

19. The method of any of clauses 16-18, further comprising receiving a set of renewed credentials from the server machine that includes a second master token comprising a second set of session keys for encrypting and authenticating messages exchanged with the server machine, wherein the second master token replaces the first master token and the second set of session keys replaces the first set of session keys.

20. The method of any of clauses 16-19, wherein the plurality of messages includes one or more additional messages that are associated with the first master token and transmitted to the server machine prior to receiving the set of renewed credentials.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to perform the steps of:
   generating entity authentication data that identifies and authenticates a client machine;
   generating user authentication data that identifies a user associated with the client machine;
   generating a first key request for generating a first plurality of session keys for encrypting and authenticating messages exchanged with the client machine; and
   transmitting a first message to a server machine that includes the entity authentication data, the user authentication data, the first key request, and payload data, wherein, prior to transmission, the first message is encrypted using a pre-provisioned encryption key,
   wherein the first plurality of session keys are generated based on decrypting the first message to retrieve the key request and the payload data, authenticating the client machine based on the entity authentication data included in the first message, and authenticating the user associated with the client machine based on the user authenticated data included in the first message.

2. The non-transitory computer-readable storage medium of claim 1, further comprising receiving, from the server machine, a second message that includes a first master token comprising the first plurality of session keys.

3. The non-transitory computer-readable storage medium of claim 2, wherein the second message further includes the entity authentication data.

4. The non-transitory computer-readable storage medium of claim 2, wherein the second message further includes a first user identification token.

5. The non-transitory computer-readable storage medium of claim 2, further comprising:
   determining that the first master token is renewable;
   generating a second key request for a second plurality of session keys; and
   transmitting a third message to the server machine that includes the first master token, the first user identification token, and the second key request.

6. The non-transitory computer-readable storage medium of claim 5, further comprising identifying the third message as renewable.

7. The non-transitory computer-readable storage medium of claim 5, further comprising receiving, from the server machine, a fourth message that includes a second master token comprising the second plurality of session keys.

8. The non-transitory computer-readable storage medium of claim 5, wherein determining that the first master token is renewable comprises determining that a threshold number of messages has been exchanged between the client machine and the server machine subsequent to receiving the first master token.

9. The non-transitory computer-readable storage medium of claim 5, wherein determining that the first master token is renewable comprises determining that a threshold amount of time has passed subsequent to receiving the first master token.

10. The non-transitory computer-readable storage medium of claim 2, wherein the client machine and the server machine communicate via a trusted services network.

11. The non-transitory computer-readable storage medium of claim 2, wherein the client machine and the server machine communicate via a peer-to-peer network.

12. The non-transitory computer-readable storage medium of claim 1, wherein the first message further includes payload data.

13. A server machine, comprising:
   a processor; and
   a memory coupled to the processor and including a base authentication module;
   a key derivation module; and a key exchange module;
   wherein, when executed by the processor, the base authentication module is configured to:
      receive a first message from a client machine that includes entity authentication data, user authentication data, and a first key request for generating a first plurality of session keys for encrypting and authenticating messages exchanged with the client machine, wherein, prior to transmission, the first message is encrypted using a pre-provisioned encryption key,
      decrypting the first message to retrieve the key request and the payload data,
      authenticating the client machine based on the entity authentication data included in the first message,
      authenticating the user associated with the client machine based on the user authenticated data included in the first message, and
      generate a signature the includes a private key for transmission to the client machine;
   wherein, when executed by the processor, the key derivation module is configured to:
      generate the first plurality of session keys in response to decrypting the first key request, authenticating the client machine, and authenticating the user associated with the client machine; and
   wherein, when executed by the processor, the key exchange module is configured to:
      transmit a second message to the client machine that includes the private key and the first plurality of session keys.

14. The server machine of claim 13, wherein:
   the memory further includes a master token generator, and, when executed by the processor, the master token generator is configured to generate a first master token, and
   the second message further includes the first master token.

15. The server machine of claim 13, wherein:
   the memory further includes a user identification token generator, and, when executed by the processor, the user identification token generator is configured to generate a first user identification token, and the second message further includes the first user identification token.

16. A computer-implemented method, comprising:
receiving, via an application program, a request to send a secure message to a server machine;
transmitting a plurality of messages to the server machine that includes a first message comprising a first key request for generating a first plurality of session keys for encrypting and authenticating messages exchanged with the server machine and at least one of user authentication data, entity authentication data, key exchange data, and encrypted message data wherein, prior to transmission, the first message is encrypted using a pre-provisioned encryption key; and
receiving, from the server machine, a second message that includes a first master token comprising the first plurality of session keys, wherein the first plurality of session keys are generated based on decrypting the first message to retrieve the key request and the payload data, authenticating the client machine based on the entity authentication data included in the first message, and authenticating the user associated with the client machine based on the user authenticated data included in the first message.

17. The method of claim 16, further comprising determining that a current time falls within a renewal window that defines a time after which the first master token is renewed if a message that is included in the plurality of messages is identified as renewable.

18. The method of claim 17, further comprising:
identifying a second message included in the plurality of messages as renewable; and
transmitting the second message to the server machine.

19. The method of claim 18, further comprising receiving a set of renewed credentials from the server machine that includes a second master token comprising a second set of session keys for encrypting and authenticating messages exchanged with the server machine, wherein the second master token replaces the first master token and the second set of session keys replaces the first set of session keys.

20. The method of claim 19, wherein the plurality of messages includes one or more additional messages that are associated with the first master token and transmitted to the server machine prior to receiving the set of renewed credentials.

* * * * *